US012211473B2

(12) United States Patent
Rannells et al.

(10) Patent No.: US 12,211,473 B2
(45) Date of Patent: Jan. 28, 2025

(54) OUTDOOR MUSICAL INSTRUMENTS

(71) Applicant: PlayCore Wisconsin, Inc., Chattanooga, TN (US)

(72) Inventors: Joshua Rannells, Eau Claire, WI (US); Richard Cooke, Hesperus, CO (US); Lindsay Hill, Chattanooga, TN (US); Kate Morrison, Signal Mountain, TN (US)

(73) Assignee: PLAYCORE WISCONSIN, INC, Chattanooga, TN (US)

( * ) Notice: Subject to any disclaimer, the term of this patent is extended or adjusted under 35 U.S.C. 154(b) by 398 days.

(21) Appl. No.: 17/557,659

(22) Filed: Dec. 21, 2021

(65) Prior Publication Data

US 2022/0199060 A1 Jun. 23, 2022

Related U.S. Application Data

(60) Provisional application No. 63/129,815, filed on Dec. 23, 2020.

(51) Int. Cl.
*G10K 1/072* (2006.01)

(52) U.S. Cl.
CPC .................................... *G10K 1/072* (2013.01)

(58) Field of Classification Search
CPC .......... G10K 1/072; G10K 1/07; G10D 13/08; G10D 13/00
See application file for complete search history.

(56) References Cited

U.S. PATENT DOCUMENTS

| | | | | |
|---|---|---|---|---|
| 991,704 A | 5/1911 | Deagan | | |
| 3,542,936 A * | 11/1970 | Babicky | .................. | G10H 3/20 84/723 |
| 5,986,194 A | 11/1999 | Schwartz et al. | | |
| 2019/0019487 A1 * | 1/2019 | Inoue | ...................... | G10K 1/10 |

FOREIGN PATENT DOCUMENTS

| | | |
|---|---|---|
| CN | 112863462 | 5/2021 |

OTHER PUBLICATIONS https://www.guitarcenter.com/Adams/15-Octave-Philharmonic-Series-Chimes-with-Gen2-Frame-15-in-1500000008216.gc?cntry=us&source=4WWRWXGP&gad_source=1&gclid=EAlalQobChMl-qzB5NbohAMVKUVHAR05MAsoEAQYCSABEgK0HPD_BWE (Year: 2024).*
Bart Hopkin, “Fork Bells”, Aug. 12, 2020, http://web.archive.org/web/20200812101128/https:!barthopkin.com/fork-bells-2/ (accessed May 25, 2022).

(Continued)

*Primary Examiner* — Kimberly R Lockett
(74) *Attorney, Agent, or Firm* — McAndrews, Held & Malloy, Ltd.

(57) ABSTRACT

The present disclosure is directed to a musical instrument comprising a plurality of chimes, each of which has a fork portion comprising first and second prongs, or tines, and a resonator portion. Each chime is configured to produce a note of a predetermined pitch and frequency when one of the tines is struck by a mallet. The instrument may also be configured so that the note produced by striking one of the tines with a mallet has a desirable sustain. Embodiments of the musical instrument may be configured for installation in an outdoor environment, such as a playground or other recreational area, and thus to withstand the stresses associated with such an installation.

25 Claims, 17 Drawing Sheets

(56) References Cited

OTHER PUBLICATIONS

Acoustic Arts, “Tone Chimes”, Jun. 25, 2021 (date on which the video was published), https://acousticarts.org.uk/products/product/tone-chimes/(accessed May 25, 2022).
Canadian Office Action for Appln. No. 3143614, dated Nov. 15, 2023, 4 pages.

* cited by examiner

OUTDOOR MUSICAL INSTRUMENTS

The present application claims priority to U.S. Provisional Patent Application No. 63/129,815, filed on Dec. 23, 2020, the entirety of which is incorporated by reference herein.

BACKGROUND

Research has shown that musical play is a key component of development in children. Music helps to build reasoning skills and cognitive development. It can increase the capacity of one's memory, refine time management and organizational skills, and teach perseverance. Playing music builds confidence, encourages creativity and self-expression. It can reduce anxiety, relieve symptoms of depression, and elevate one's mood. The Brain and Creativity Institute found that musical experiences in childhood can accelerate brain development, particularly in the areas of language acquisition and reading skills.

Research has also shown that being outside enhances a child's development. Nature is important to children's development in every major way—intellectually, emotionally, socially, spiritually and physically. Kellert, Stephen R., "Nature and Childhood Development", *In Building for Life: Designing and Understanding the Human-Nature Connection*, Island Press, 2005. "Experience of the outdoors has the potential to confer a multitude of benefits on young people's physical development, emotional and mental health and well-being and societal development. Mental health and wellbeing benefits from play in natural settings appear to be long-term, realized in the form of emotional stability in young adulthood." Travlou, Penny, "Wild Adventure Space For Young People", *OPENspace Individual Literature Reviews* (2006).

As such, instruments placed in outdoor learning environments enable "children to explore natural sounds in the environment, make loud music, compose music individually and collaboratively, and move expressively." Spencer, Karin H, et al., Quality Outdoor Play Spaces for Young Children, *Young Children*, pp 28-34 (2014).

SUMMARY OF THE INVENTION

Embodiments of the present disclosure are directed to an outdoor musical instrument comprising one or more, and preferably a plurality of, chimes. In contrast to conventional outdoor musical instruments in which the chime is a hollow tube, however, each of the one or more chimes of the present instrument comprises a fork portion that includes at least first and second prongs, also known as tines, and a resonator portion. The chime is configured so that a user strikes one of the tines with a mallet, causing vibration of the tines to produce a note of a specific, predetermined pitch. The resonator portion of the chime causes the note to produce a full and rich sound for a sustained period of time.

The pitch and frequency of each chime may be defined by the dimensions and thickness of the tines. In some embodiments, the instrument may comprise chimes that produce at least two, alternatively at least three, alternatively at least four, alternatively at least five different notes. In some embodiments, the instrument may comprise chimes that produce at least two, alternatively at least three, alternatively at least four, alternatively at least five of the following notes: A, C, D, E, G.

The resonator of each chime may be configured to produce a desired fullness of sound. One or more of the chimes may comprise a quarter-wave resonator, in which the resonator end is closed off, such as with a resonator end-cap. One or more of the chimes may comprise a half-wave resonator, in which the resonator end is open. In general, it has presently been found that half-wave resonators produce a more desirable result for chimes having smaller cross-sections and quarter-wave resonators produce a more desirable result for chimes having larger cross-sections. However, unless otherwise specified, any chime may comprise a quarter-wave resonator, a half-wave resonator, or a different type of resonator.

The positioning and orientation of the one or more chimes may be selected to provide a desired play experience. Each chime may have a longitudinal axis that spans between the fork end of the chime and the resonator end of the chime. In some embodiments, each chime may be positioned such that the longitudinal axis is perpendicular with a ground surface to which the instrument is mounted. For example, the plurality of chimes may be positioned such that the fork end of each chime is vertically below the resonator end, such that the fork end of each chime is vertically above the resonator end, or such that the fork end of at least one chime is vertically below the resonator end and the fork end of at least one chime is above the resonator end. In other embodiments, each chime may be positioned such that the longitudinal axis is parallel with the ground surface to which the instrument is mounted. In yet other embodiments, each chime may be positioned such that the longitudinal axis is angled between 1 degree and 89 degrees, alternatively between 5 degrees and 85 degrees, alternatively between 10 degrees and 80 degrees, alternatively between 20 degrees and 70 degrees, alternatively between 30 and 60 degrees with the ground surface. Each embodiment will provide a different user playing experience.

In some embodiments, the outdoor musical instrument may comprise a set of chimes made up of a plurality of chimes positioned next to one another and oriented in the same direction, e.g. such that the fork portion of each chime is adjacent the fork portion of each neighboring chime. In some embodiments, the plurality of chimes that make up a set may be arranged in a straight line or a curved line, although it is also contemplated that a plurality of chimes may be arranged to form any of a variety of geometrical shapes, e.g. circle, polygon, etc. The plurality of chimes in a set may be arranged in order of ascending or descending frequency.

In some embodiments, the outdoor musical instrument may include a first set of chimes and a second set of chimes. The plurality of chimes that make up the first set may be positioned next to one another and oriented in the same direction, e.g. such that the fork portion of each chime is adjacent the fork portion of each neighboring chime. Similarly, the plurality of chimes that make up the second set may be positioned next to one another and oriented in the same direction, e.g. such that the fork portion of each chime is adjacent the fork portion of each neighboring chime.

The first set of chimes may be positioned above (either in a vertical dimension or in relation to the user if the chimes are oriented parallel to the ground surface) the second set of chimes and may be inverted relative to the second set of chimes so that the fork portion of the first set of chimes and the fork portion of the second set of chimes face one another. In this way, the portion of the first set of chimes that is struck by a user may be positioned adjacent the portion of the second set of chimes that is struck by a user to create a striking area (as opposed to the alternative embodiment in which the first and second set of chimes are oriented in the same direction). To help a user easily identify this striking area, the instrument may comprise mounting plates that define the upper and lower boundaries of the striking area. For instance, the instrument may comprise a first mounting plate positioned adjacent the fork portions of each of the first set of chimes and a second mounting plate positioned adjacent the fork portion of each of the second set of chimes, the first and second mounting plates defining a chime striking area.

The second set of chimes may differ from the first set of chimes or the second set of chimes may be identical to the first set of chimes. In some embodiments, the chimes in the first set may each have a cross-sectional area that is larger than a cross-sectional area of each of the chimes in the second set or vice versa. Similarly, the chimes in the first set may each comprise a resonator end-cap and the chimes in the second set may each comprise an open resonator end or vice versa.

In some embodiments, each chime may be configured so that, when one of the tines is struck by the mallet, the note that is produced sustains for a desired period of time. The length of the sustain depends not only on the design of the chime itself, but also on the manner in which the chime is mounted to the supporting framework. To produce a desired sustain, each chime may be mounted to a framework by one or more bushings, e.g. rubber bushings. The bushing(s) is/are positioned so as to maintain a separation between the chime and the framework. In other words, the bushing(s) is/are positioned between the exterior of the chime and the framework.

At least one of the chimes may comprise a first aperture and a second aperture on opposing walls of the chime, one or more fasteners may pass through the first and second apertures to mount the chime to the framework, and one or more bushings may be positioned around at least a portion of each fastener. In some embodiments, for example, a first fastener may pass through the first aperture and be received by a first slot in the framework and a second fastener may pass through the second aperture and be received by a second slot in the framework. A first bushing may be positioned around at least a portion of the first fastener and a second bushing may be positioned around at least a portion of the second fastener. Alternatively, a fastener may pass through each of the first and second apertures, such that a first end of the fastener may be received by a first slot in the framework and a second end of the fastener may be received by a second slot in the framework. In that embodiment, a first bushing may be positioned around at least a first portion of the fastener and a second bushing may be positioned around at least a second portion of the fastener.

In some embodiments, the first and second apertures may be located on the resonator portion of the chime and within three inches of the fork portion, alternatively within two inches of the form portion, and alternatively about one inch above the fork portion. The securement of the chime to the framework in this location may be desirable in order that the tines may vibrate freely without the resonator portion of the chime rattling within the framework.

The instrument may also include at least one support post having a top end and a bottom end, the bottom end being configured for mounting to an outdoor surface. In some embodiments, for example, the support post may include a base plate at a lower end, the base plate being configured to be attached to an outdoor surface. In some embodiments, the instrument may include a first support post and a second support post and a plurality of chimes may be positioned between the first and second support posts.

The instrument may also include one or more mounting plates, which secure the plurality of chimes to the one or more support posts. In some embodiments, each chime may be secured in place by at least a first mounting plate and a second mounting plate. Each chime may be mounted to one or more of the mounting plates by any of a variety of mounting assemblies, including for example those described above. In some embodiments, for example, the chime may comprise first and second apertures positioned on opposing walls of the chime, and one or more fasteners may pass through the first and second apertures and be received by slots in the first mounting plate, thereby securing the chime within an aperture of the first mounting plate. Such a mounting assembly need not be utilized on each mounting plate, however. For instance, the chime may be held within an aperture of a second mounting plate by a gasket, e.g. a rubber gasket.

The mounting plates may each comprise an upper element and a lower element. The mounting plates, and more particularly each element, may comprise a plurality of openings through which the chimes are positioned. The slots or channels that receive the mounting assemblies for the chimes may be positioned in the lower element, in the upper element, or may be formed by a combination of the lower and upper elements. The upper and lower elements may be held together by fasteners. In some embodiments, at least one of the fasteners may also secure the mounting plate to a first support post and at least another one of the fasteners may also secure the mounting plate to a second support post.

The instrument may also comprise one or more mallets. The one or more mallets may have a head, e.g. a rubber head, of a durometer that is configured to produce a desired sound when used to strike the chimes. The one or more mallets may be attached to the instrument, e.g. to a portion of the framework such as a mounting plate, a support post, or the like, by one or more cables. The term cable, as used herein, is intended to comprise any flexible element by which a mallet may be suspended and yet allows a user to use the mallet to strike the chimes, and includes for example chains, ropes, cords, and the like. In other embodiments, the one or more mallets may be attached by one or more cables to a separate mallet-support structure that is configured to be installed adjacent to the musical instrument. In some embodiments, the instrument may comprise a docking station with apertures configured to releasably receive the mallets.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION OF THE INVENTION

Figure 1:
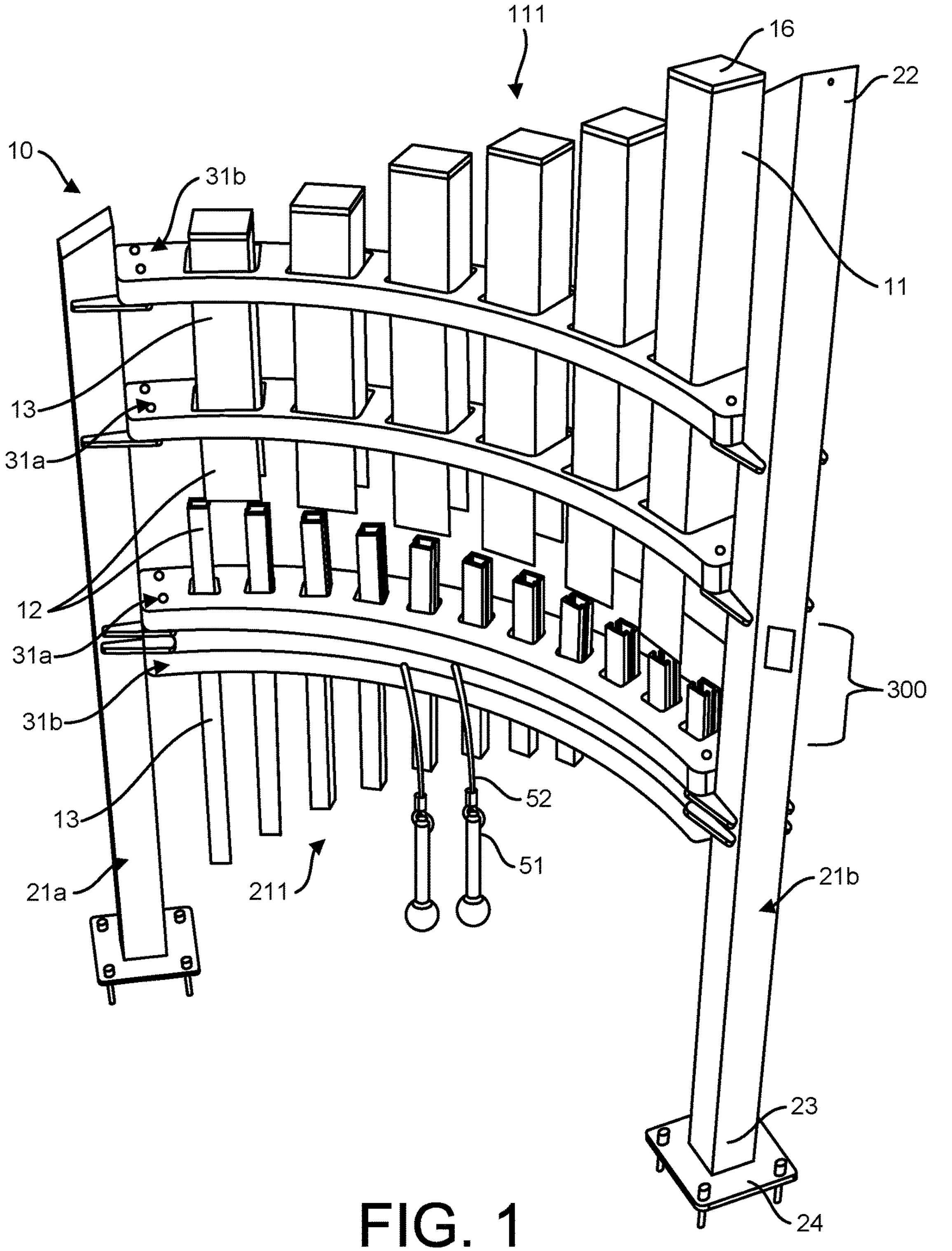
FIG. 1 is a perspective view of an embodiment of an outdoor musical instrument according to the present disclosure.
Figure 2:
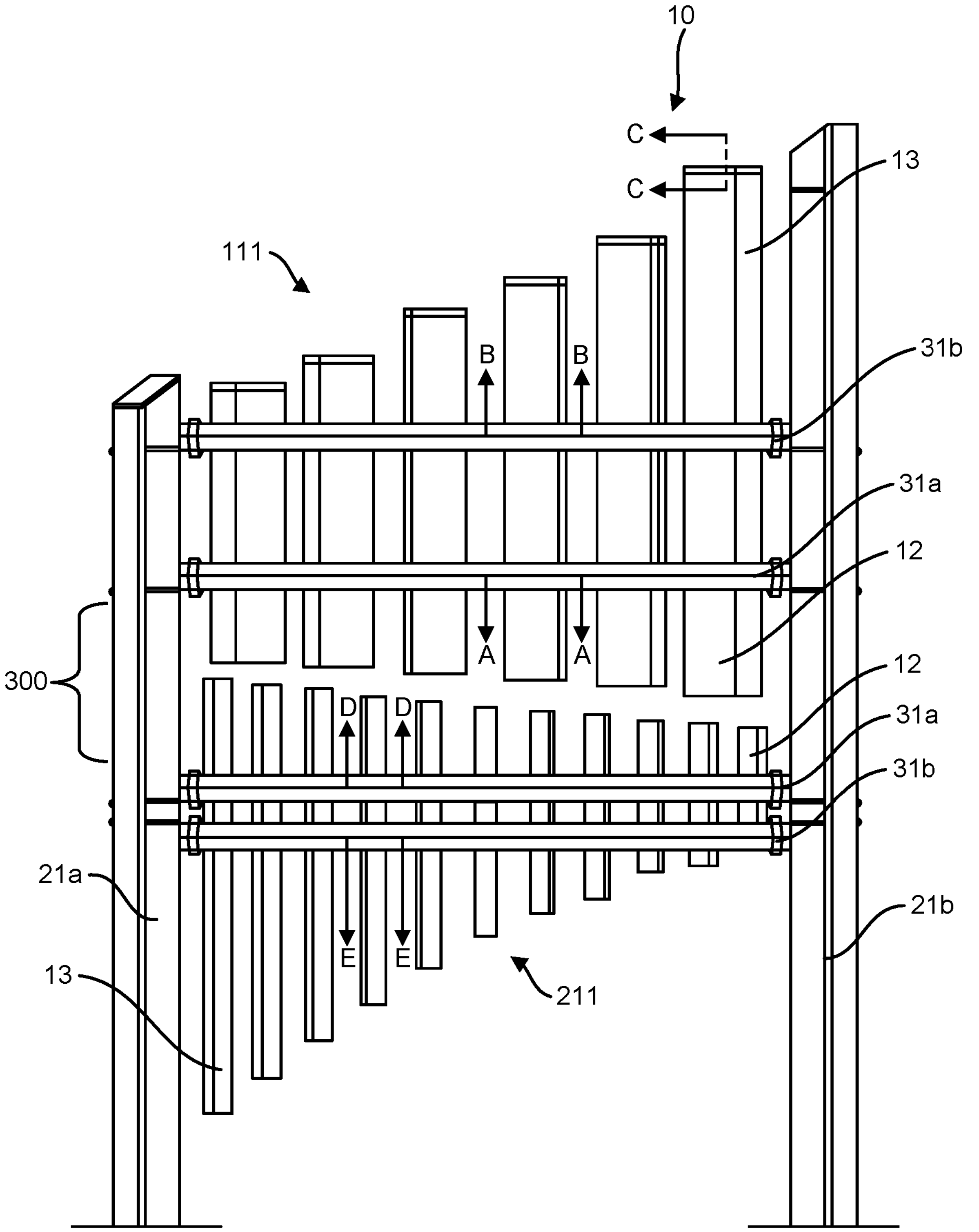
FIG. 2 is a front plan view of the embodiment shown in FIG. 1.

Embodiments of the present disclosure are directed to an outdoor instrument 10 having one or more chimes 11 configured to play a musical note when struck with a mallet, and preferably a plurality of chimes configured to play a plurality of musical notes when struck with a mallet. The plurality of chimes can be arranged and oriented in any of a variety of different manners without departing from the scope of the present invention. However, an embodiment of an outdoor instrument 10 according to the present disclosure is illustrated in FIGS. 1-15.

In contrast with conventional chimes, which are hollow metal tubes, each chime 11 of the present disclosure comprises a fork portion 12 and a resonator portion 13. Each chime 11 also has a longitudinal axis L that spans between the fork end of the chime 14 and the resonator end of the chime 15. Examples of chimes 11 of the present disclosure are shown in FIGS. 16 through 19.

The fork portion 12 comprises at least first and second prongs, also known as tines 12*a*, 12*b*. At least one, and desirably each, of the tines 12*a*, 12*b* is configured to have a sufficient surface area, i.e. width and length, to be struck by a mallet. The fork portion 12 is configured so that when a user strikes one of the tines 12*a*, 12*b* with a mallet, the tines vibrate to produce a note of a predetermined pitch and frequency.

The pitch and frequency of each chime 11 may be defined by the dimensions, and in particular the length, and thickness of the tines 12*a*, 12*b*. By controlling the dimensions and thickness of the tines 12*a*, 12*b*, a chime 11 may be configured to produce any of a variety of notes, for instance selected from A, B, C, D, E, F, and G, as well as the flats and sharps of each.

In some embodiments, the notes produced by the plurality of chimes 11 may all be within the same musical scale. In some embodiments, for example, the notes produced by the plurality of chimes 11 may fall within a pentatonic scale. A pentatonic scale is a musical scale with five notes per octave. Because of its relative simplicity, this scale may be used to introduce beginners to music. It is also common in many types of traditional music. In some embodiments, the notes produced by the plurality of chimes 11 may fall within a heptatonic scale, which is the most common 7-note scale used in Western music. In other embodiments, the notes produced by the plurality of chimes 11 may be of a diatonic scale, a tritonic scale, a tetratonic scale, a hexatonic scale, octatonic scale, nonatonic scale, or a decatonic scale.

In some embodiments, the instrument may comprise chimes 11 that produce at least two, alternatively at least three, alternatively at least four, alternatively at least five different notes, alternatively at least six, alternatively at least seven. In some embodiments, the instrument may comprise chimes 11 that produce at least two, alternatively at least three, alternatively at least four, alternatively at least five, alternatively at least six, alternatively at least seven of the following notes: A, B C, D, E, F, G. In some embodiments, the instrument may comprise chimes 11 that produce at least two, alternatively at least three, alternatively at least four, alternatively at least five of the following notes: A, C, D, E, G (i.e. notes within a C-Major pentatonic scale).

The resonator portion 13 causes the note that is produced when one of the tines 12*a*, 12*b* is struck by a mallet to have a full and rich sound for a sustained period of time. In some embodiments, the resonator portion 13 may comprise a quarter-wave resonator or a half-wave resonator.

For instance, the resonator portion 13 of one or more of the chimes 11 may be a quarter-wave resonator, in which the resonator end 15 is closed off, such as with a resonator end-cap, or plug 16. In a chime 11 having a quarter-wave resonator, the sound waves that are produced by vibration of the tines 12*a*, 12*b* travel to the resonator end 15 of the resonator 13, bounce off the end-cap 16, and exit the chime through the fork end 14. The resonator end-cap 16 may be made of any of a variety of materials and preferably comprises a weather-resistant polymer such as HDPE. The resonator portion 13 of one or more of the chimes 11 may comprise a half-wave resonator, in which the resonator end 15 is open and uncapped. In a chime 11 having a half-wave resonator, the sound waves that are produced by vibration of the tines 12*a*, 12*b* travel to the resonator end 15 and exit the chime through the resonator end.

In general, it has presently been found that half-wave resonators 13 produce a more desirable result for chimes 11 having smaller cross-sections and quarter-wave resonators produce a more desirable result for chimes having larger cross-sections. However, unless otherwise specified, any chime 11 may comprise a quarter-wave resonator, a half-wave resonator, or a different type of resonator.

As shown in the embodiments illustrated in FIGS. 16-19, each chime 11 may comprise four walls arranged to provide a rectangular or square cross-section. However, in other embodiments, the chime 11 may comprise a different number of walls arranged to provide a different polygonal, oval-shaped, circular, or customized/irregular cross cross-section. Relatedly, as shown in the illustrated embodiments, the first and second tines 12*a*, 12*b* are simply portions of opposing walls of the resonator portion 13 that extend beyond the other walls. This may also be true for a chime 11 having a different polygonal cross-section. Similarly, for a chime 11 having an oval-shaped or circular cross-section, the tines 12*a*, 12*b* may be portions of opposing arcs of the resonator portion 13 that extend beyond other arcs. The specific geometry of the fork portion 12 will define the pitch and frequency of the sound that is produced by vibration of the tines 12*a*, 12*b* when struck by a mallet. The specific geometry and length of the resonator portion 13 may be designed to produce a desired fullness and richness of the sound, and/or to increase its sustain.

In some embodiments, including those illustrated in FIGS. 16-19, the fork portion 12 of a chime may have a much smaller length than the resonator portion 13 of the chime. For instance, in some embodiments, for at least one of the chimes 11 and potentially each of the chimes, the ratio between the length of the fork portion 12 and the length of the resonator portion 13 may be between 1:1.5 and 1:7, alternatively between 1:2 and 1:6.

Each chime 11 may be made of any of a variety of metals. In some embodiments, the chimes 11 may desirable by made of aluminum, which has been found to function well as the material of the tines 12*a*, 12*b* and to have a desired degree of weather resistance and durability. The chimes 11 may also be treated to provide enhanced protection against environmental damage and corrosion. For instance, aluminum chimes 11 may be anodized.

In some embodiments, each chime 11 may be configured so that, when one of the tines 12*a*, 12*b* is struck by the mallet 51, the note sustains for a period of time between about 2 and about 30 seconds, alternatively between about 2 and about 25 seconds, alternatively between about 2 and about 22 seconds, alternatively between about 3 and about 30 seconds, alternatively between about 3 and about 25 seconds, alternatively between about 3 and about 22 seconds, alternatively between about 4 and about 30 seconds, alternatively between about 4 and about 25 seconds, alternatively between about 4 and about 22 seconds. In some embodiments, different chimes 11 may be configured to have different sustain times, so that there is a variety of different effects produced by striking the various chimes. For instance, one or more of the chimes 11 may have a relatively long sustain time, e.g. between about 15 and 30 seconds, while one or more of the chimes may have a relatively shorter sustain time, e.g. between about 2 and 14 seconds. In some embodiments, at least one of the chimes 11 may have a sustain time of at least 10 seconds, alternatively at least 12 seconds, alternatively at least 15 seconds, alternatively at least 20 seconds.

Each chime 11 may comprise one or more apertures 17 that are used to mount the chime to a supporting framework of the instrument 10. In the illustrated embodiments, for example, the chime 11 comprises a first aperture 17*a* and a second aperture 17*b* aligned with one another and positioned on opposing walls of the chime. In particular, the first and second apertures 17*a*, 17*b* may be positioned on the opposite walls as the first and second tines 12*a*, 12*b*. In some embodiments, the first and second apertures 17*a*, 17*b* may be located on the resonator portion 13 of the chime and within three inches of the fork portion 12, alternatively within two inches of the fork portion, alternatively between about 0.25 and 2 inches above the fork portion, alternatively between about 0.25 inches and 1.5 inches above the fork portion, alternatively between about 0.5 and about 2 inches above the fork portion, alternatively between about 0.5 and 1.5 inches above the fork portion, alternatively about one inch above the fork portion. The securement of the chime 11 to the framework in this location may be desirable in order that the tines 12*a*, 12*b* may vibrate freely without the resonator portion 13 of the chime rattling within the framework.

The outdoor musical instrument 10 may also comprise at least one support post 21. The support post 21 positions and supports the chimes 11 at a desired elevation above a ground surface. In the illustrated embodiment, the instrument 10 has a first support post 21*a* and a second support post 21*b*, and the plurality of chimes 11 are positioned between the two support posts. In alternative embodiments, however, a single support post 21 may be used to position and support the plurality of chimes 11 above the ground surface. Additional framework elements may also be used in combination with the one of more support posts 21 to produce instruments having a variety of designs without departing from the scope of the present disclosure.

As shown in the illustrated embodiments, each support post 21 may have an upper end 22 and a lower end 23. The lower end 23 may be configured for mounting to an outdoor surface. In some embodiments, for example that illustrated in FIG. 1, the support post 21 may include a base plate 24 at its lower end 23. The base plate 24 may be configured to be attached to an outdoor surface. As illustrated, the base plate 24 may have a larger radial dimension than the support post 21 itself and may be configured to mounting to an outdoor ground surface in any of a variety of ways. In some embodiments, the base plate 24 may comprise one or more, and preferably a plurality, of apertures 25, each of which is configured to receive one or more fasteners 26. The one or more fasteners 26 may comprise any conventional fasteners, including for example, screws, bolts, nuts, expansion anchors, and the like.

Figure 11:
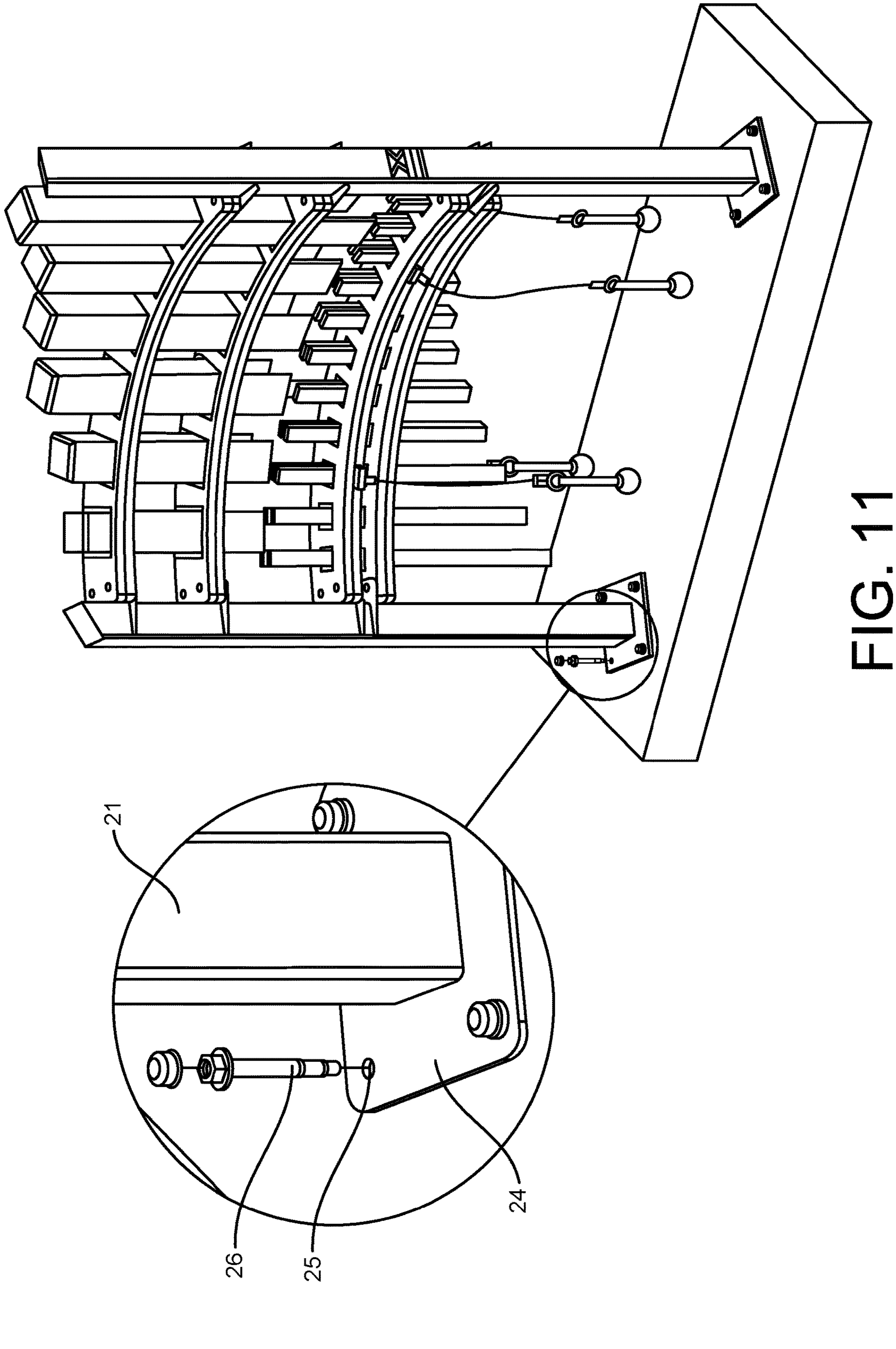
FIG. 11 is a front perspective view of the embodiment shown in FIG. 1, mounted in an outdoor environment using a surface mount.

In some embodiments, the base plate 24 may be mounted directly to an outdoor surface, as shown for example in FIG. 11. For instance, the one or more fasteners 26 may pass through the one or more apertures 25 in base plate 24 and directly into a ground surface, such as a concrete or other artificial surface material. Accordingly, the one or more fasteners 26 may comprise one or more concrete (e.g. expansion) anchors, concrete screws, or the like. In (non-illustrated) other embodiments, the base plate 24 may be affixed to an in-ground post, e.g. by again passing one or more fasteners through the apertures 25 in the base plate. In yet other (non-illustrated) embodiments, the base plate 24 may similarly be affixed to a portable stand, e.g. a flat-bottomed and large-footprint component upon which the instrument would be stabilized in an upright position on a flat ground surface.

Figure 12:
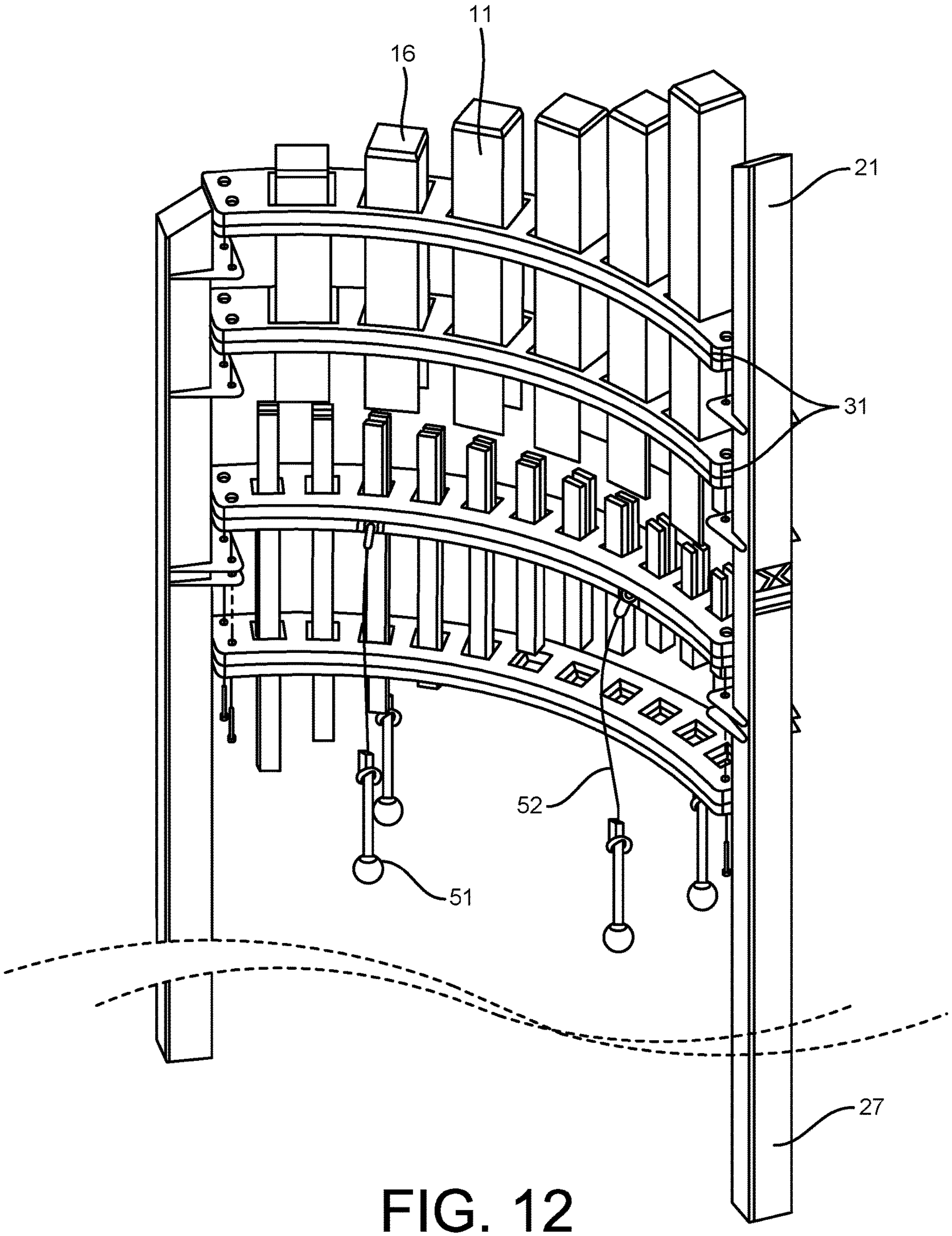
FIG. 12 is a front perspective view of an embodiment of an outdoor musical instrument according to the present disclosure in which the support posts comprise extensions for in-ground mounting.
Figure 13:
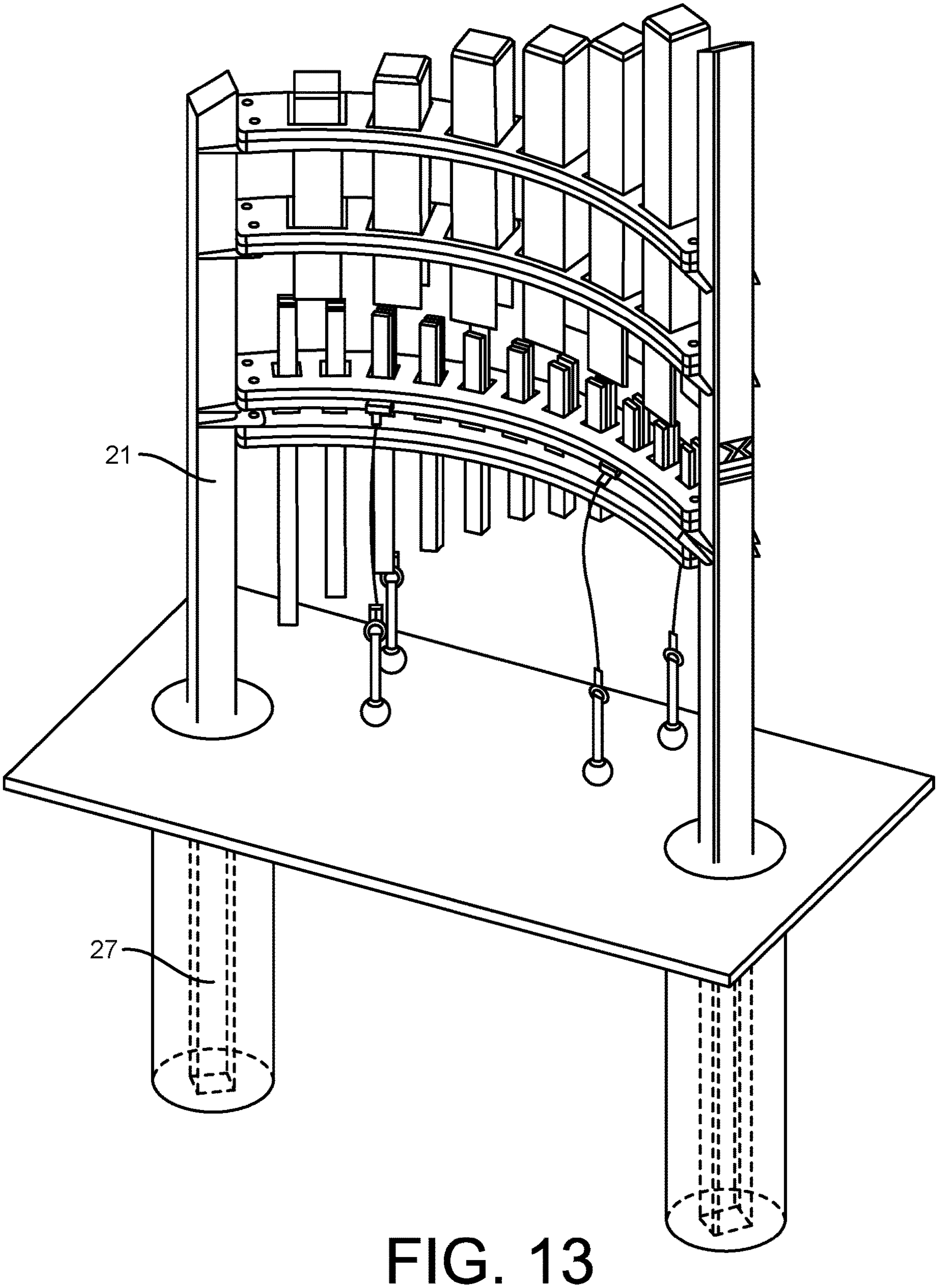
FIG. 13 is a front perspective view of the embodiment shown in FIG. 12, mounted in an outdoor environment.
Figure 14:
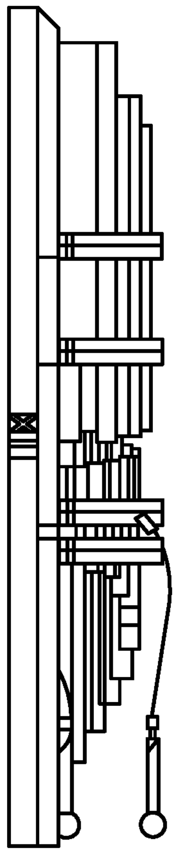
FIG. 14 is a side plan view of the embodiment shown in FIG. 1.
Figure 15:
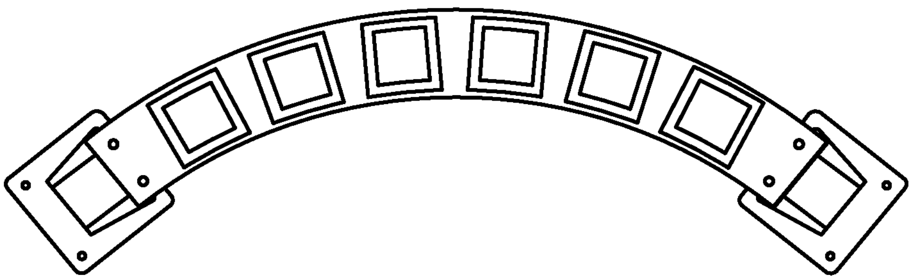
FIG. 15 is a top elevation view of the embodiment shown in FIG. 1.
Figure 16:
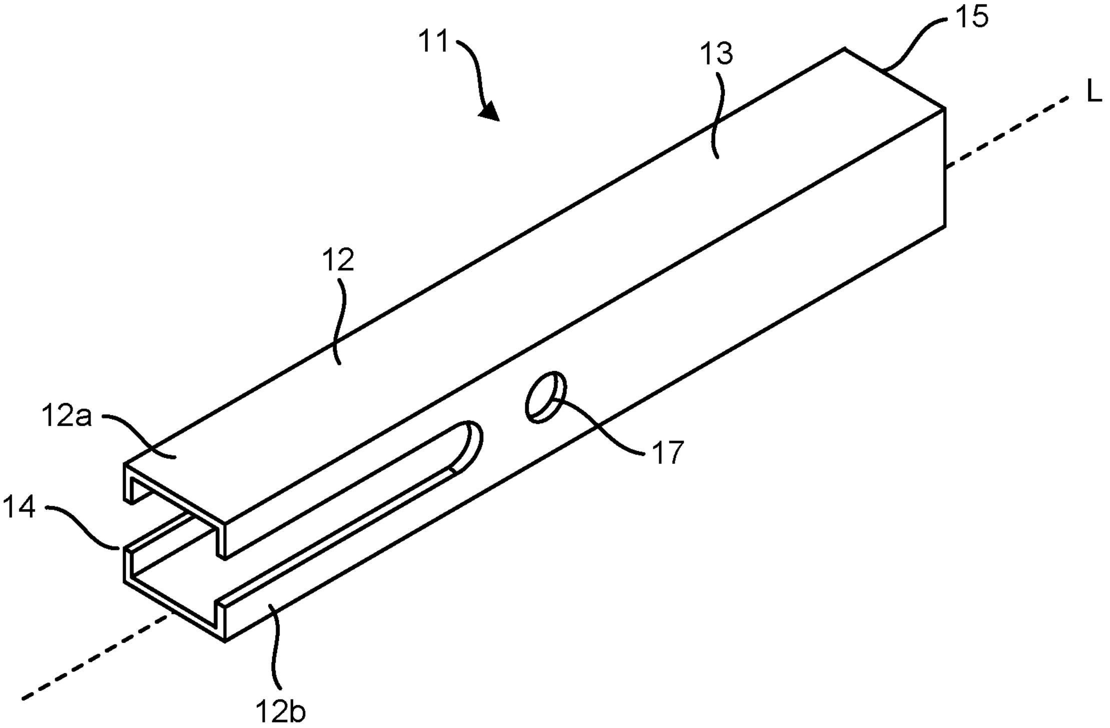
FIG. 16 is a perspective view of a chime of an embodiment of an outdoor musical instrument according to the present disclosure.
Figure 17:
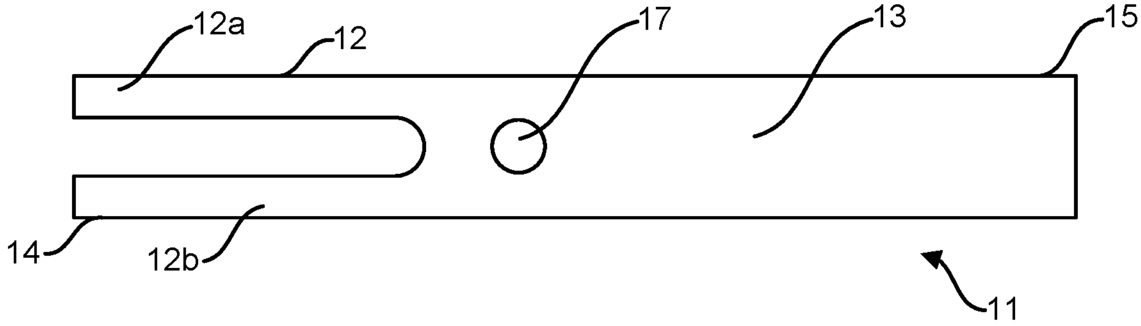
FIG. 17 is a side plan view of the chime shown in FIG. 16.
Figure 18:
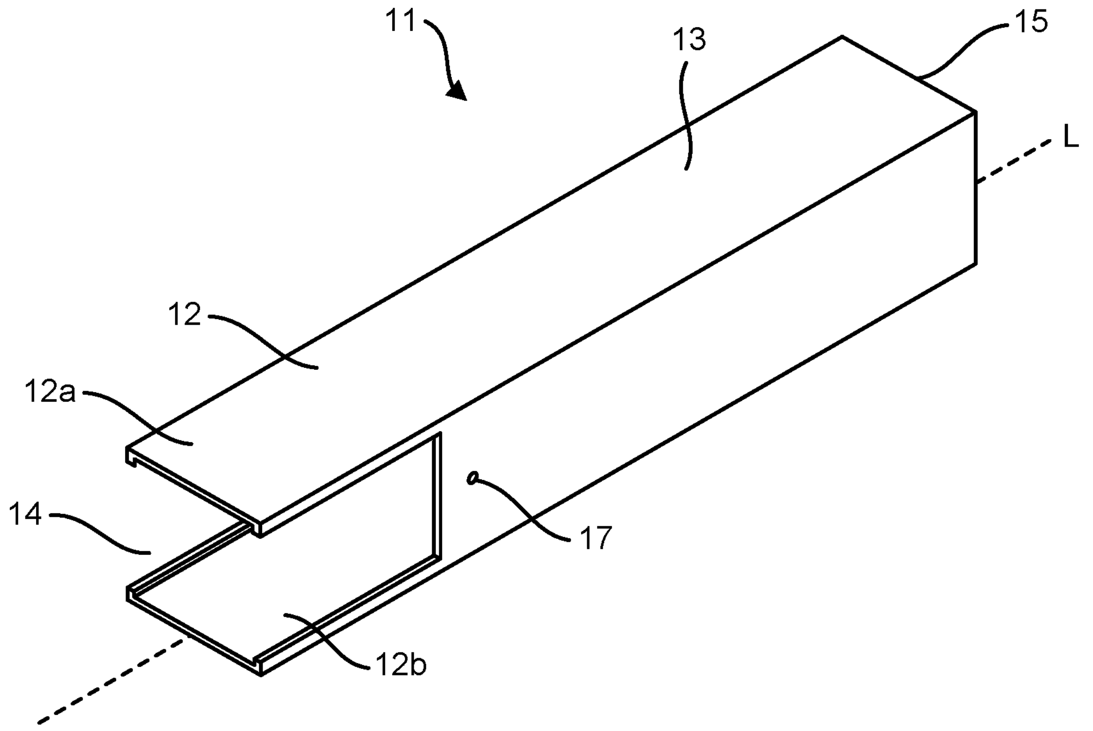
FIG. 18 is a perspective view of a chime of an embodiment of an outdoor musical instrument according to the present disclosure.
Figure 19:
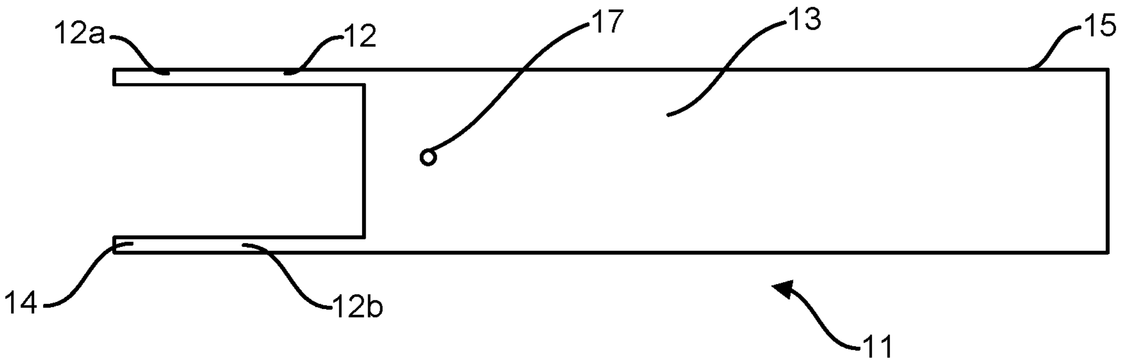
FIG. 19 is a side plan view of the chime shown in FIG. 18.

In other embodiments, the one or more support posts 21 may comprise an in-ground post 27, as shown for example in FIG. 12 as being an extended downward portion of the support post (having an undefined length). The in-ground post 27 is configured to be inserted below the ground surface, such as into a hole. Once inserted into the hole, concrete may be poured around the post 27 to secure the instrument 10 in an upright position. An example of such an installation is shown in FIG. 13.

The support post(s) 21 may be made from any of a variety of materials, so long as the support post has the necessary strength and weather resistance to stand up to prolonged outdoor environmental exposure and use. In some embodiments, the support post 21 may comprise stainless steel or powder-coated steel pipe. The powder coating serves to protect the steel against corrosion and other environmental degradation. As an alternative to powder coating, the steel pipe may be galvanized.

In addition to the support post(s) 21 and any additional framework elements that may be present, the instrument 10 may also include one or more mounting plates 31, which secure the plurality of chimes 11 in place. As shown in the illustrated embodiment, each chime 11 may be secured in place by at least a first mounting plate 31*a* and a second mounting plate 31*b*. In other embodiments, however, a single mounting plate 31 may be used to secure each chime 11 in place. As shown in the illustrated embodiment, the mounting plates 31*a*, 31*b* are used to secure a plurality of chimes 11 within a set in place. In other embodiments, however, each chime 11 in a set may be secured in place by one or more independent mounting elements or mounting elements that are shared only with a subset of the plurality of chimes, e.g. with an adjacent chime.

Figure 8:
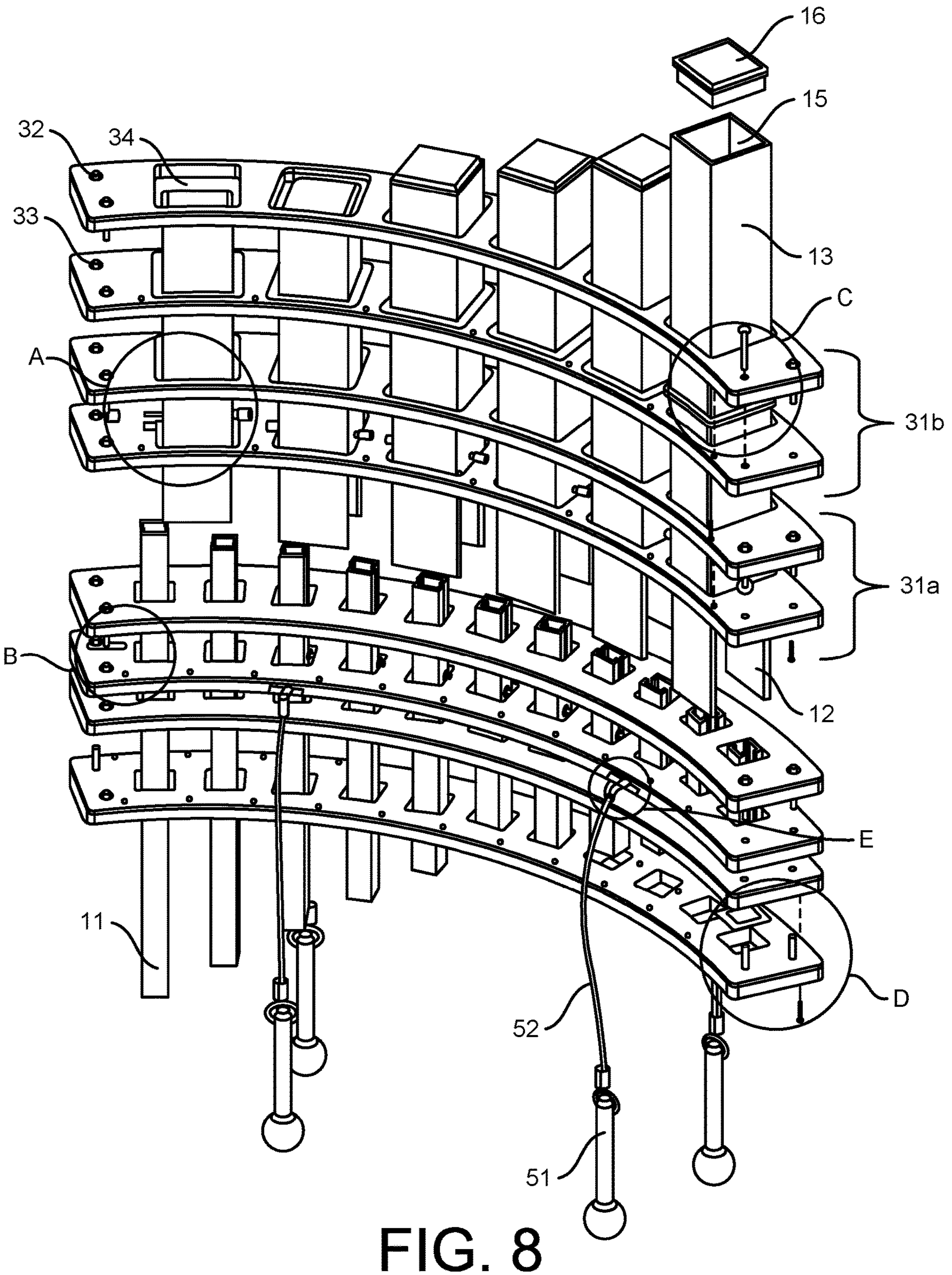
FIG. 8 is an exploded perspective view of a central portion of the embodiment shown in FIG. 1, showing the connections between the chimes and the mounting plates.

As shown in the illustrated embodiment, see for example FIG. 8, the mounting plates 31 may each comprise an upper element 32 and a lower element 33. The mounting plates 31 also comprise a plurality of openings 34, or cavities, through which the chimes 11 are positioned. In other (non-illustrated) embodiments, the upper and lower elements 32, 33 of a mounting plate 31 may be configured and arranged so that the upper element 32 spans across the front faces of the plurality of chimes and the lower element 33 spans across the rear faces of the plurality of chimes, as in the chime products sold by FreeNotes Harmony Park™ under the trade names HARP or SERENADE.

Figure 9:
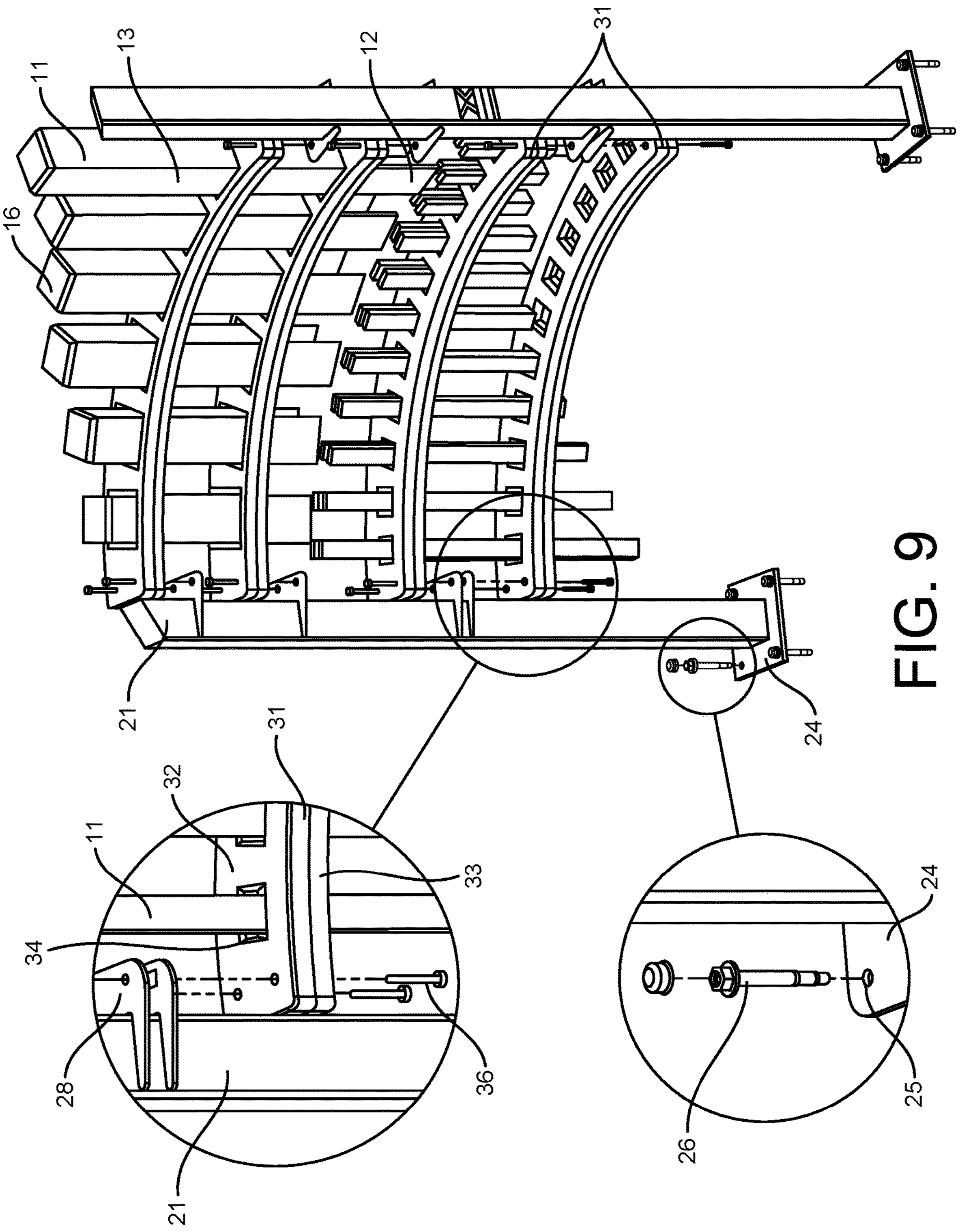
FIG. 9 is an exploded front perspective view of the embodiment shown in FIG. 1, showing the connections between the mounting plates and the support posts.
Figure 10:
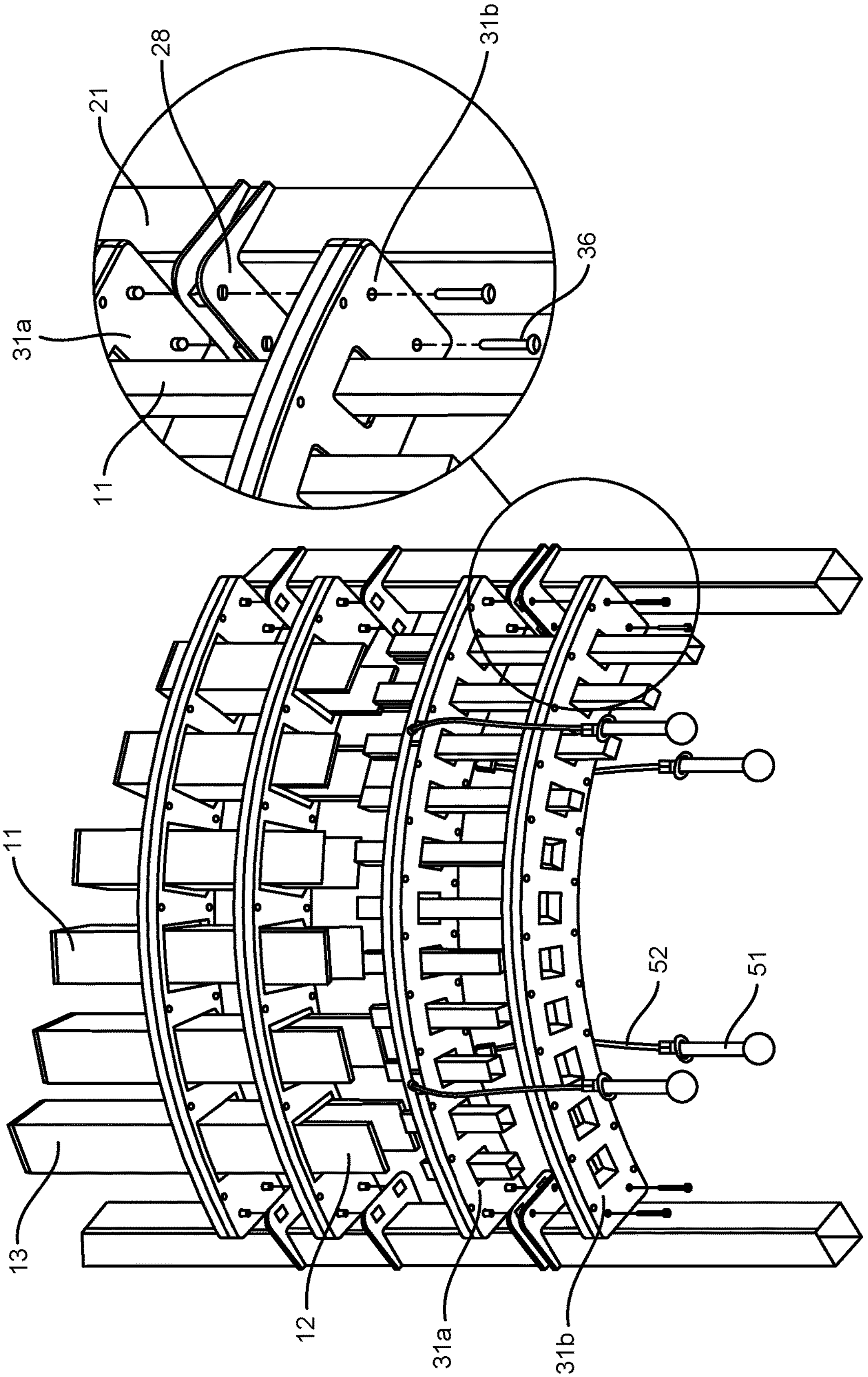
FIG. 10 is an exploded rear perspective view of the embodiment shown in FIG. 1, showing the connections between the mounting plates and the support posts.

The upper and lower elements 32, 33 may be held together by a plurality of fasteners 36, as shown for example in FIGS. 9 and 10. In some embodiments, at least one of the fasteners 36 may also secure the mounting plate 31 to the support post 21 or to an additional framework element. In the illustrated embodiment, for example, at least one fastener 36 also secures the mounting plate 31 to the first support post 21*a* and at least another one of the fasteners also secures the mounting plate to the second support post 21*b*, see for example FIG. 9. In particular, the mounting plates 31 are shown as being secured to ribs 28, which are positioned at defined locations along the support posts 21.

Each chime 11 may be mounted to one or more of the mounting plates 31 by any of a variety of mounting assemblies. For instance, one or more fasteners 41 may pass through the one or more apertures 17 and be received by the mounting plate 31, and more particularly by a channel or slot of the mounting plate 37. The chime 11 may also be spaced apart from the walls of the mounting plate that form the opening 34 into which the chime is placed by one or more bushings 42. By mounting the chime 11 in this manner, the chime may be kept relatively free from interference by the mounting plate 31, providing an improved sustain when one of the tines 12*a*, 12*b* is struck by a mallet.

Figure 3:
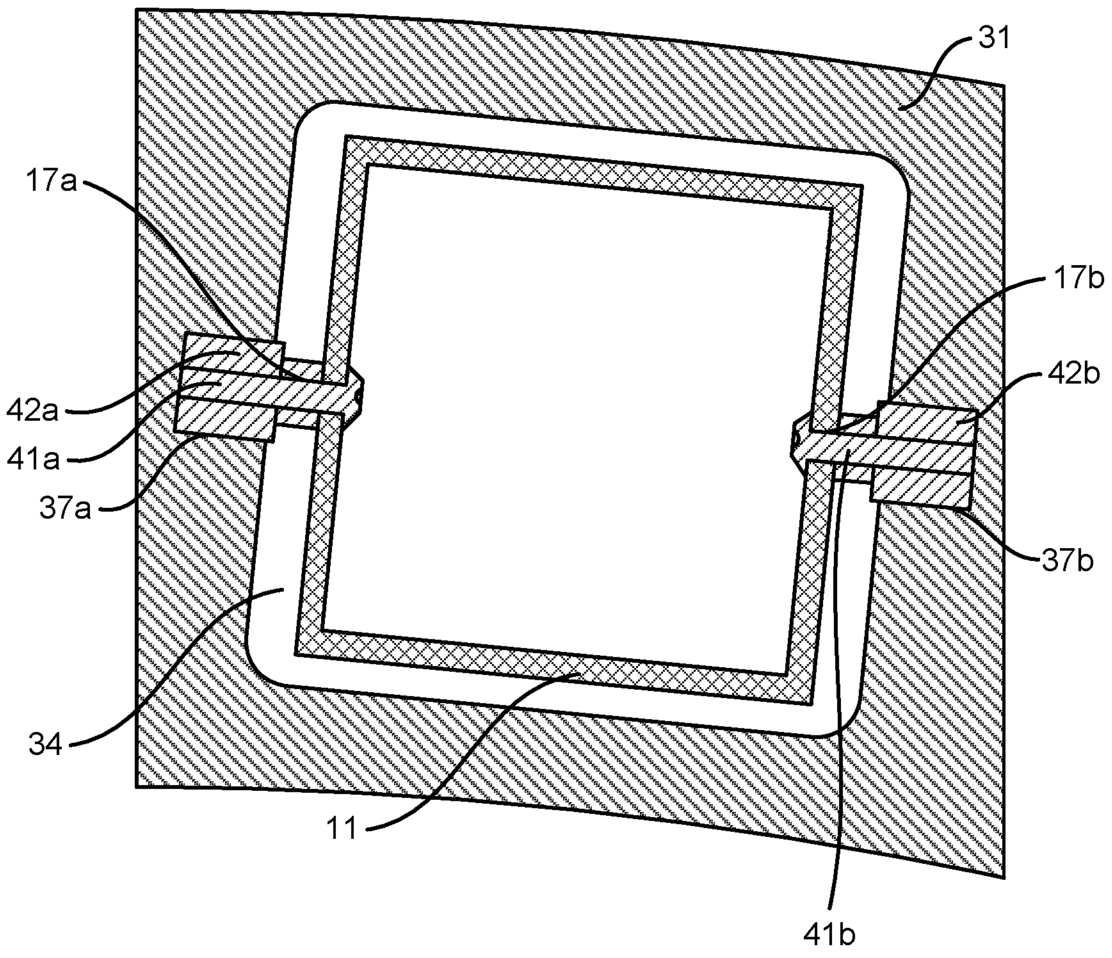
FIG. 3 is a cross-sectional view taken along line A-A of FIG. 2.
Figure 4:
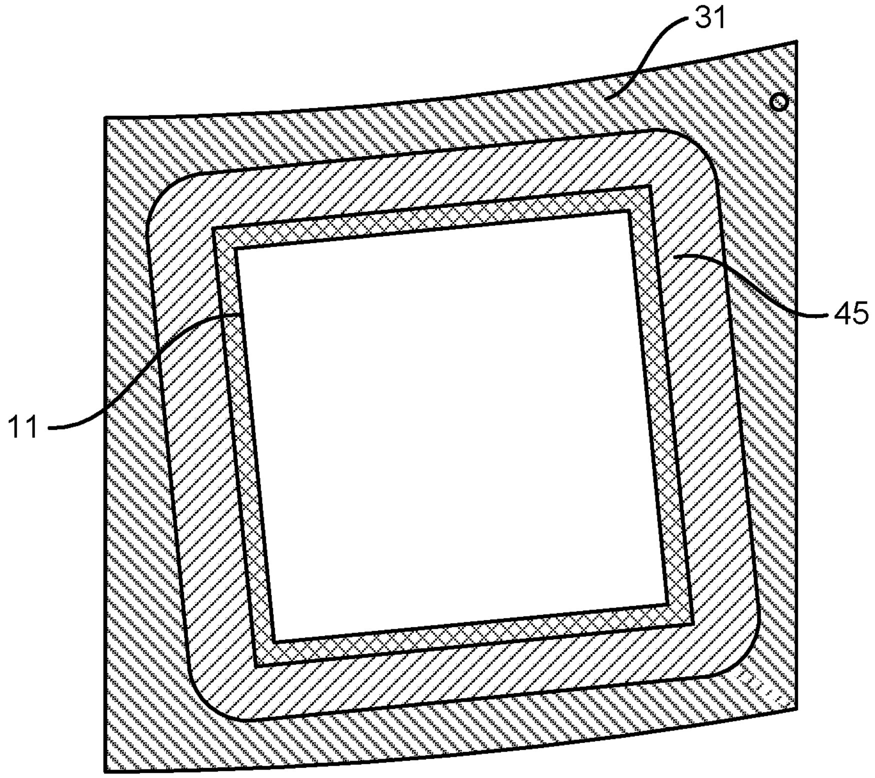
FIG. 4 is a cross-sectional view taken along line B-B of FIG. 2.
Figure 5:
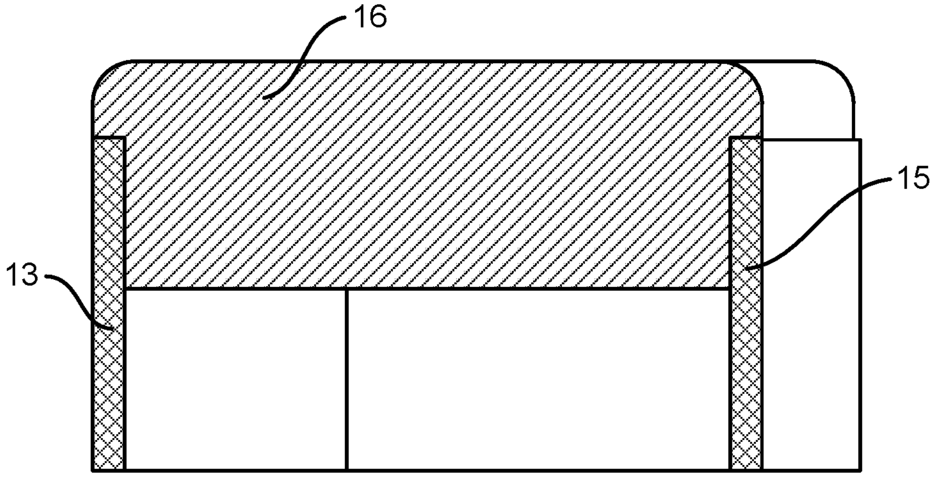
FIG. 5 is a cross-sectional view taken along line C-C of FIG. 2.
Figure 8A:
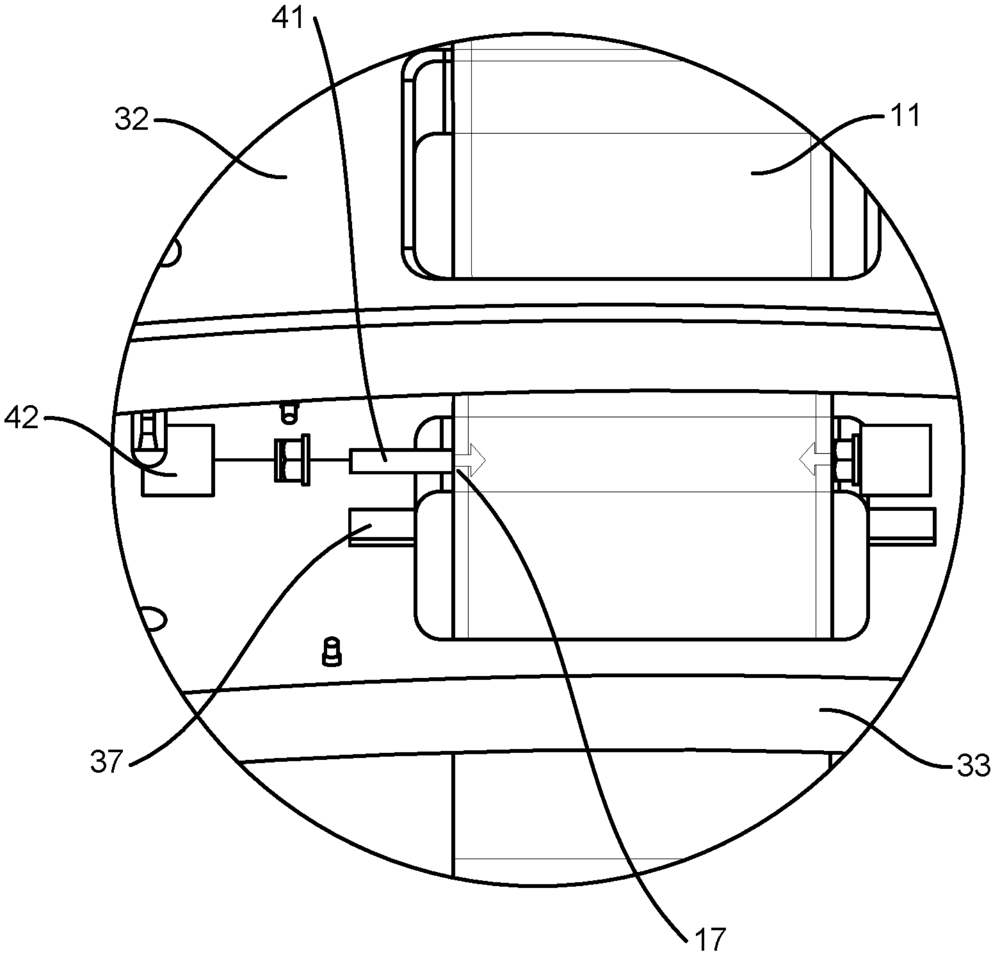
FIG. 8A is a details view of the portion of FIG. 8 labeled A.

In some embodiments, including that shown in FIGS. 3 and 8A, for example, the chime 11 may comprise first and second apertures 17*a*, 17*b*. A first fastener 41*a* may pass through the first aperture 17*a* and be received by a first slot 37*a* in the mounting plate 31 and a second fastener 41*b* may pass through the second aperture 17*b* and be received by a second slot 37*b* in the mounting plate. In the illustrated embodiment, the first and second fasteners each comprise a button head screw, though any of a variety of conventional fasteners may be utilized as would be understood by those of skill in the art. A first bushing 42*a* may be positioned around at least a portion of the first fastener 41*a* and a second bushing 42*b* may be positioned around at least a portion of the second fastener 41*a*.

Figure 6:
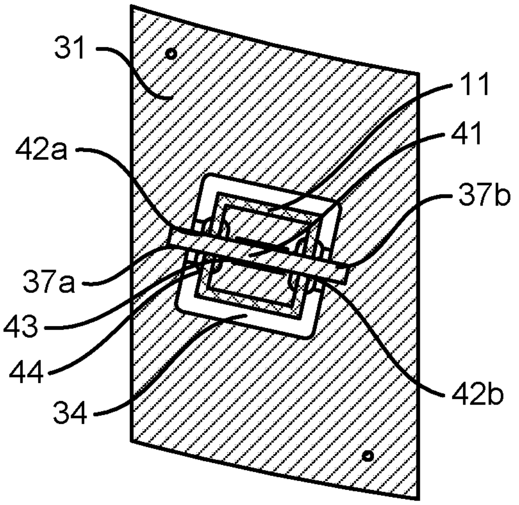
FIG. 6 is a cross-sectional view taken along line D-D of FIG. 2.
Figure 7:
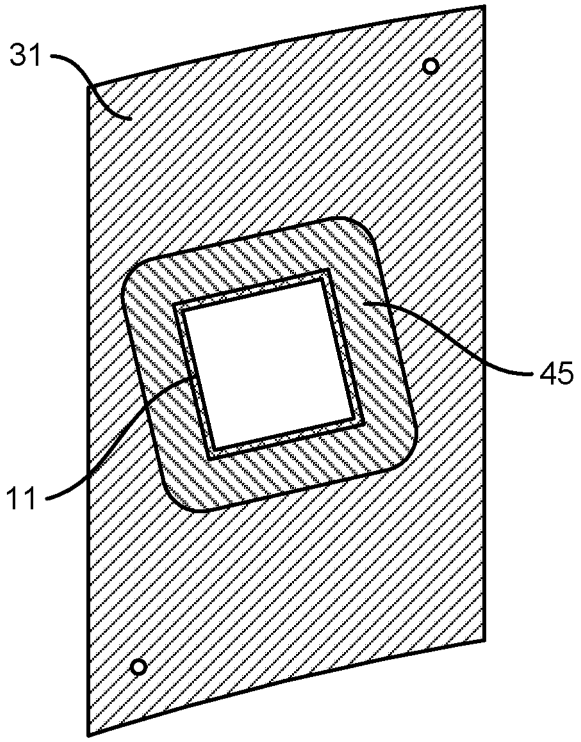
FIG. 7 is a cross-sectional view taken along line E-E of FIG. 2.
Figure 8B:
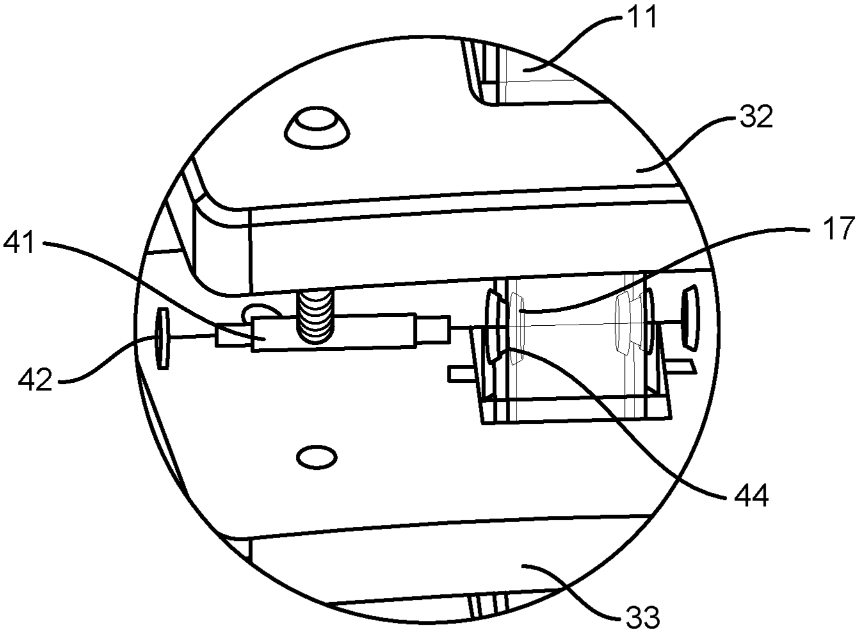
FIG. 8B is a details view of the portion of FIG. 8 labeled B.
Figure 8C:
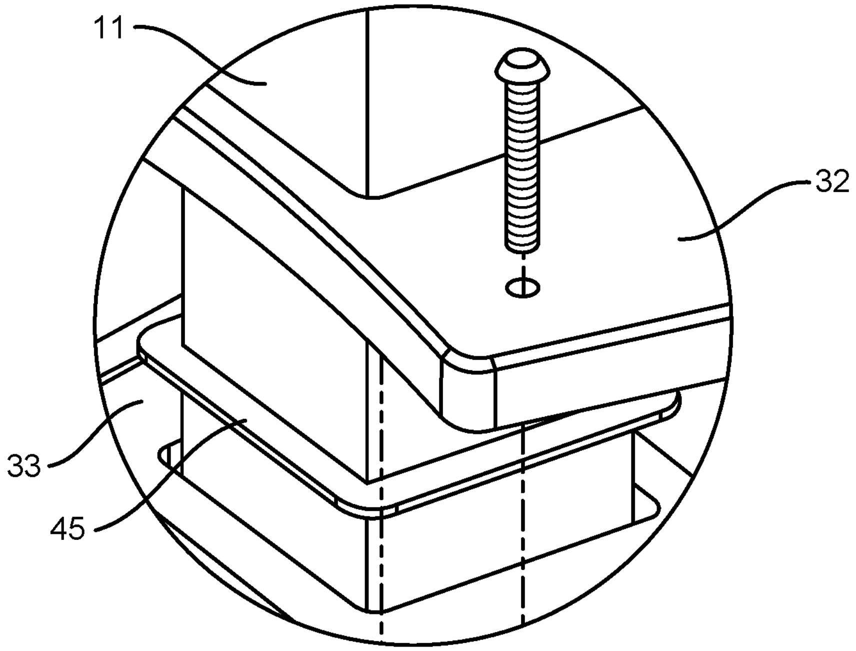
FIG. 8C is a details view of the portion of FIG. 8 labeled C.
Figure 8D:
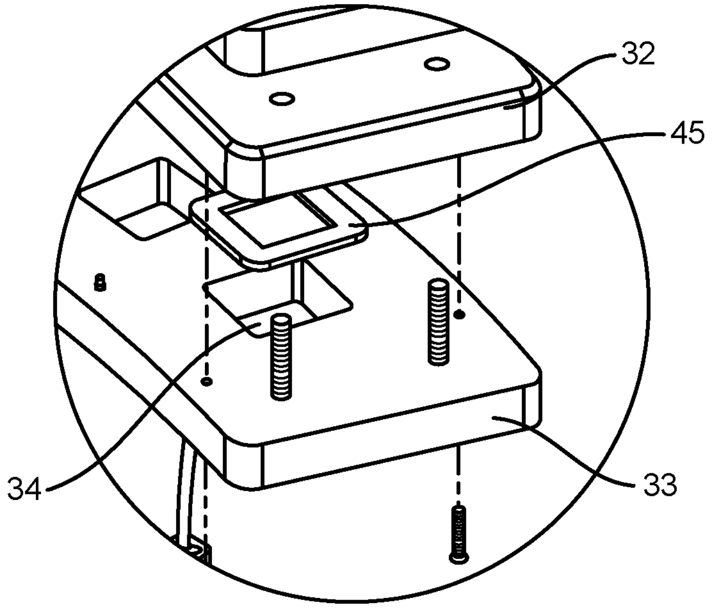
FIG. 8D is a details view of the portion of FIG. 8 labeled D.

In other embodiments, including that shown in FIGS. 6 and 8B, for example, the chime 11 may comprise first and second apertures 17*a*, 17*b* and a single fastener 41 may pass through both apertures. In the illustrated embodiment, for example, the fastener 41 comprises a dowel pin, though any of a variety of conventional fasteners may be utilized as would be understood by those of skill in the art. A first end of the fastener 41 may be received by a first slot 37*a* in the mounting plate 31 and a second end of the fastener may be received by a second slot 37*b* in the mounting plate. In that embodiment, a first bushing 42*a* may be positioned around at least a first portion of the fastener 41 and a second rubber bushing 42*b* may be positioned around at least a second portion of the fastener. In such an embodiment, a polymeric tubing 43 may also be inserted around the portion of the fastener 41 contained within the interior of the chime 11. In the illustrated embodiment, for example, the portion of the dowel pin positioned within the interior of the chime 11 is sheathed with a PVC/polyurethane tubing, though any of a variety of materials may be utilized as would be understood by those of skill in the art.

The bushings 42 may be made of a variety of materials, but are preferably made of rubber (natural or synthetic). The bushings 42 can also take on any of a variety of forms. In the embodiment illustrated in FIG. 3, for example, the bushings 42 comprise portions of silicone tubing. In the embodiment illustrated in FIG. 6, on the other hand, the bushings 42 comprise EPDM washers.

In some embodiments, a grommet 44, such as a rubber grommet, may be placed in the aperture 17 to further prevent the chime 11 from direct contact with the fastener 41. In the embodiment illustrated in FIG. 6, for example, EPDM grommets are placed in each of apertures 17*a*, 17*b* to prevent contact between the chime and the dowel pin. Though not shown in the embodiment illustrated in FIG. 3, grommets 44 could similarly be used in that embodiment as well.

The slots or channels 37 that receive the fasteners 41 may be positioned in the lower element 33 of the mounting plate 31, in the upper element 32 of the mounting plate, or may be formed by a combination of the lower and upper elements.

If a chime 11 is secured in place by more than one mounting plate 31, it is not necessary that a mounting assembly of the sort described above be used the secure the chime within a cavity 34 of any additional mounting plate. For instance, in the illustrated embodiment, each chime 11 is secured to the first mounting plate 31*a* by one or more fasteners 41 that pass through apertures 17 on opposing walls of the chime and are received by slots 37 in the mounting plate. However, each chime 11 is secured within a cavity 34 of the second mounting plate 31*b* by a simple rubber gasket 45. This can best be seen, for example, in FIGS. 4, 7, 8C, and 8D.

Figure 8E:
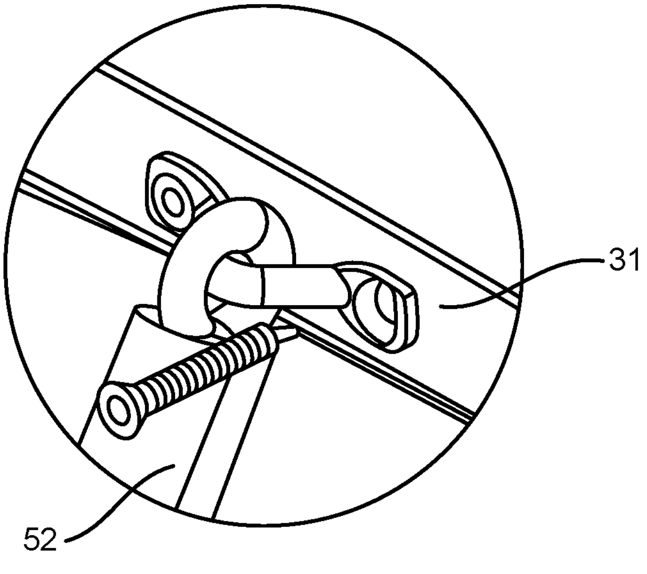
FIG. 8E is a details view of the portion of FIG. 8 labeled E.

The musical instrument 10 may also comprise one or more mallets 51 that a user may use to strike the one or more chimes 11. The one or more mallets 51 may be connected to the musical instrument by one or more cables 52. In some embodiments, for example, a pair of mallets 51 is connected to one of the mounting plates 31 by cables 52. In other embodiments, however, the mallets 41 may be connected to a support post 21 or to any additional framework elements that may be present. The cables 52 may be attached to the mounting plate 31 (or other element) using any conventional attachment member, an example of which is shown in FIG. 8E.

In some embodiments, including that illustrated, the instrument 10 may comprise multiple pairs of mallets 51. As shown, for instance, a first pair of mallets 51 may be positioned on one side of the instrument, also referred to herein as the front, and a second pair of mallets may be positioned on the opposite side of the instrument, also referred to herein as the rear. In this way, a first user can strike the tines 12*a* facing the front of the instrument 10 and a second user can strike the tines 12*b* facing the rear of the instrument. In other embodiments, the instrument 10 may only includes a single pair of mallets 51, e.g. on the front of the instrument. In yet other embodiments, multiple pairs of mallets 51 may be positioned next to each other along a single side, e.g. the front or rear, of the instrument 10. For instance, two or more pairs of mallets 51 could be positioned next to each other and attached along the length of the mounting plate 31. Though the mallets 51 in a pair are shown as being spaced apart from one another in the illustrated embodiment, they could for example be placed in closer proximity to one another, allowing more space for a second pair along the same side. Or, of course, the number of chimes 11 in each set may be increased to produce a larger instrument 10 that more easily accommodate multiple users per side.

Although not illustrated, the musical instrument 10 may also comprise one or more docking stations for the mallets 51, such that the mallets do not hang downward as shown in the illustrated embodiment but may instead be placed in the docking station. In alternative (non-illustrated) embodiments, an additional mallet-support structure may be provided in the vicinity of the musical instrument 10 and the mallets 51 may be secured to the mallet-support structure. The mallet-support structure may itself comprise one or more docking stations.

The chimes 11 may be arranged and oriented in any of a variety of configurations to provide a desired play experience. In some embodiments, including the illustrated embodiment, each chime 11 may be positioned such that the longitudinal axis L is perpendicular with a ground surface to which the instrument 10 is mounted. The chimes 11 may be positioned such that the fork end 14 of each chime is vertically below the resonator end 15 or such that the fork end of each chime is vertically above the resonator end. In the illustrated embodiment, the fork end 14 of each chime within a first set of chimes 111 (the upper set) is positioned vertically below the resonator end 15. On the other hand, the fork end 14 of each chime within a second set of chimes 211 (the lower set) is positioned vertically above the resonator end 15.

In other embodiments, each chime 11 may be positioned such that the longitudinal axis L is parallel with the ground surface to which the instrument is mounted. This may provide an instrument 10 in which the tines 12*a*, 12*b* to be struck by a user are upward-facing, creating a play experience somewhat similar to that of playing a metallophone, e.g. a vibraphone.

In yet other embodiments, each chime 11 may be positioned such that the longitudinal axis L is angled between 1 degree and 89 degrees, alternatively between 5 degrees and 85 degrees, alternatively between 10 degrees and 80 degrees, alternatively between 20 degrees and 70 degrees, alternatively between 30 and 60 degrees with the ground surface. By providing the chimes 11 at a different angle, the instrument 10 may provide a different user playing experience.

In some embodiments, including the illustrated embodiment, the outdoor musical instrument 10 may comprise a set of chimes (e.g. 111 or 211) made up of a plurality of chimes 11 positioned next to one another and oriented in the same direction, e.g. such that the fork portion 12 of each chime is adjacent the fork portion of each neighboring chime. In some embodiments, the plurality of chimes 11 that make up a set may be arranged in a straight line or a curved line, although it is also contemplated that a plurality of chimes may be arranged to form any of a variety of geometrical shapes, e.g. circle, polygon, etc. In some embodiments, the plurality of chimes 11 in a set may be arranged in order of ascending or descending frequency. In some embodiments, the plurality of chimes 11 in a set may be from the same musical scale.

In some embodiments, the outdoor musical instrument may include a first set of chimes 111 and a second set of chimes 211. The plurality of chimes 11 that make up the first set 111 may be positioned next to one another and oriented in the same direction, e.g. such that the fork portion 12 of each chime is adjacent the fork portion of each neighboring chime. Similarly, the plurality of chimes 11 that make up the second set 211 may be positioned next to one another and oriented in the same direction, e.g. such that the fork portion 12 of each chime is adjacent the fork portion of each neighboring chime.

The first set of chimes 111 may be positioned above the second set of chimes 211 and may be inverted relative to the second set of chimes so that the fork portions 12 of the first set of chimes and the fork portions of the second set of chimes face one another. In this way, the fork portions 12 of the first set of chimes 111 that are struck by a user may be positioned adjacent the fork portions 12 of the second set of chimes 211 that are struck by a user to create a striking area 300 (as opposed to the alternative embodiment in which the first and second set of chimes are oriented in the same direction). By the first set of chimes 111 being positioned above the second set of chimes 211, it is meant that the first set of chimes 111 may be above the second set of chimes either (i) in a vertical dimension, as shown in the illustrated embodiment, (ii) in relation to the front of the instrument where a user would be located, such as if the chimes are oriented parallel to the ground surface, or (iii) both (i) and (ii), such as if the chimes are oriented at a non-parallel and non-perpendicular angle with the ground surface.

To help a user easily identify a striking area 300, the instrument 10 may comprise indicia that define the upper and/or lower boundaries of the striking area. In some embodiments, one or more mounting plates 31 may be used as the indicia. In the illustrated embodiment for instance, a mounting plate 31*a* for the first set of chimes 111 is positioned adjacent the fork portions 12 of each of the first set of chimes and a mounting plate 31*a* for the second set of chimes 211 is positioned adjacent the fork portions 12 of each of the second set of chimes. The area between those two mounting plates is thus easily identified as the chime striking area 300.

The second set of chimes 211 may differ from the first set of chimes 111 or the second set of chimes may be identical to the first set of chimes. In the illustrated embodiment, for example, the chimes in the first set 111 each have a cross-sectional area that is larger than a cross-sectional area of each of the chimes in the second set 211. Similarly, the chimes in the first set 111 each comprise a resonator end-cap 16 and the chimes in the second set 211 each have an open resonator end 15. This embodiment provides the additional benefit that the interiors of the chimes are largely protected from environmental precipitation and from the insertion of items by children.

Alternatively, however, the chimes in the second set 211 may each have a cross-sectional area that is larger than a cross-sectional area of each of the chimes in the first set 111 and/or the chimes in the second set 211 may each comprise a resonator end-cap 16 while the chimes in the first set 11 may have an open resonator end 15. The exact arrangement and variation of the chimes 11 both within a set and between different sets may be selected to provide a desired play experience.

It can be seen that the described embodiments provide unique and novel outdoor instruments 10 that have a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. An outdoor musical instrument comprising:
a plurality of chimes, each chime comprising
a fork portion, the fork portion comprising first and second tines, and a resonator portion;
each chime being configured to produce a note having a defined pitch when one of the first and second tines is struck by a mallet;
wherein the plurality of chimes comprises a first set of chimes and a second set of chimes;
wherein the first set of chimes is positioned above the second set of chimes; and
wherein the first set of chimes and the second set of chimes are positioned so that the fork portion of the first set of chimes and the fork portion of the second set of chimes face one another.

2. The outdoor musical instrument of claim 1, further comprising a first mounting plate positioned adjacent the fork portions of each of the first set of chimes and a second mounting plate positioned adjacent the fork portion of each of the second set of chimes, the first and second mounting plates defining a chime striking area.

3. The outdoor musical instrument of claim 1, wherein each of the chimes in the first set has a cross-sectional area that is larger than a cross-sectional area of each of the chimes in the second set.

4. The outdoor musical instrument of claim 3, wherein each of the chimes in the first set comprises a resonator end-cap.

5. The outdoor musical instrument of claim 4, wherein each of the chimes in the second set comprises an open resonator end.

6. The outdoor musical instrument of claim 1, wherein each of the first set of chimes and the second set of chimes is arranged in a straight or curved line.

7. The outdoor musical instrument of claim 6, wherein each of the first set of chimes and the second set of chimes are arranged in order of ascending or descending frequency.

8. The outdoor musical instrument of claim 1, wherein the plurality of chimes includes chimes that produce each of the following notes: A, C, D, E, G.

9. An outdoor musical instrument comprising:
a plurality of chimes, each chime comprising
a fork portion, the fork portion comprising first and second tines, and a resonator portion;
each chime being configured to produce a note having a defined pitch when one of the first and second tines is struck by a mallet; and
each chime having a longitudinal axis that spans between a fork end and a resonator end;
wherein each chime is positioned such that the longitudinal axis is perpendicular with a ground surface; and
wherein the plurality of chimes are positioned such that
(a) the fork end of each chime is below the resonator end
(b) the fork end of each chime is above the resonator end, or
(c) the fork end of at least one chime is below the resonator end and the fork end of at least one chime is above the resonator end.

10. An outdoor musical instrument comprising:
a plurality of chimes, each chime comprising
a fork portion, the fork portion comprising first and second tines, and a resonator portion;
each chime being configured to produce a note having a defined pitch when one of the first and second tines is struck by a mallet; and
in which each chime is configured so that the note sustains for between about 2 seconds and about 30 seconds when one of the first and second tines is struck by a mallet.

11. The musical instrument of claim 10, wherein each chime is mounted to a framework by one or more bushings, the one or more bushings being positioned between the chime and the framework.

12. The musical instrument of claim 11, wherein at least one of the plurality of chimes comprises a first aperture and a second aperture, the first and second apertures being positioned on opposing walls of the chime, and wherein one or more fasteners passes through the first and second apertures to mount the chime to the framework.

13. The musical instrument of claim 12, wherein a first fastener passes through the first aperture and is received by a first slot in the framework, and a second fastener passes through the second aperture and is received by a second slot in the framework, and
a first bushing is positioned around at least a portion of the first fastener and a second bushing is positioned around at least a portion of the second fastener.

14. The musical instrument of claim 12, wherein a fastener passes through each of the first and second apertures,
a first end of the fastener is received by a first slot in the framework and a second end of the fastener is received by a second slot in the framework, and
a first bushing is positioned around at least a first portion of the fastener and a second bushing is positioned around at least a second portion of the fastener.

15. The outdoor musical instrument of claim 12, wherein the first and second apertures are located on the resonator portion of the chime and within two inches of the fork portion.

16. An outdoor musical instrument comprising:
a plurality of chimes, each chime comprising
a fork portion, the fork portion comprising first and second tines, and a resonator portion;
each chime being configured to produce a note having a defined pitch when one of the first and second tines is struck by a mallet;

one or more support posts having a top end and a bottom end, the bottom end being configured for mounting to an outdoor surface; and one or more mounting plates securing the plurality of chimes to the one or more support posts.

17. The outdoor musical instrument of claim 16, wherein each chime is secured in place by at least a first mounting plate and a second mounting plate.

18. The outdoor musical instrument of claim 17, wherein each chime comprises a first aperture and a second aperture, the first and second apertures being positioned on opposing walls of the chime, and wherein one or more fasteners passes through the first and second apertures and is received by slots in the first mounting plate, thereby securing the chime within a cavity of the first mounting plate.

19. The outdoor musical instrument of claim 18, wherein each chime is held within a cavity of the second mounting plate by a rubber gasket.

20. The outdoor musical instrument of claim 17, wherein each mounting plate comprise an upper element and a lower element, and wherein the upper and lower elements are held together by fasteners.

21. The outdoor musical instrument of claim 20, wherein at least one of the fasteners also secures the mounting plate to a first support post and at least another one of the fasteners also secures the mounting plate to a second support post.

22. The outdoor musical instrument of claim 16, wherein each of the one or more support posts comprises a base plate at a lower end.

23. The outdoor musical instrument of claim 22, wherein the base plate is attached to an outdoor surface.

24. The outdoor musical instrument of claim 1, further comprising one or more mallets.

25. The outdoor musical instrument of claim 24, wherein the one or more mallets are attached to a framework of the instrument by one or more cables.

* * * * *